US 6,543,755 B2

(12) United States Patent
Monson et al.

(10) Patent No.: US 6,543,755 B2
(45) Date of Patent: Apr. 8, 2003

(54) STACKED TETRAHEDRAL ELASTOMER MOUNT

(75) Inventors: Robert James Monson, St. Paul, MN (US); Trevor J. McCollough, Minneapolis, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/779,716

(22) Filed: Feb. 8, 2001

(65) Prior Publication Data

US 2002/0105121 A1 Aug. 8, 2002

(51) Int. Cl.[7] .................................................. F16F 9/12
(52) U.S. Cl. ........................................ 267/136; 188/266
(58) Field of Search ................................ 267/136, 153; 188/371, 266

(56) References Cited

U.S. PATENT DOCUMENTS

| | | | | |
|---|---|---|---|---|
| 3,011,602 A | * | 12/1961 | Ensrud et al. .............. | 244/123 |
| 3,689,345 A | * | 9/1972 | Figge et al. ................. | 156/219 |
| 3,933,387 A | * | 1/1976 | Salloum et al. ............. | 267/140 |
| 4,059,254 A | | 11/1977 | Fielding-Russel et al. .. | 267/140 |
| 4,348,442 A | * | 9/1982 | Figge ......................... | 108/56.1 |
| 4,495,327 A | * | 1/1985 | Schenck et al. ............. | 204/499 |
| 4,601,611 A | * | 7/1986 | Tagomori et al. ........... | 267/140 |
| 4,901,486 A | * | 2/1990 | Kobori et al. .............. | 188/377 |
| 5,065,555 A | * | 11/1991 | Kobori et al. .............. | 248/548 |
| 5,100,730 A | * | 3/1992 | Lambers .................. | 428/313.3 |
| 5,177,915 A | * | 1/1993 | Kobori et al. .............. | 248/548 |
| 5,232,061 A | * | 8/1993 | Neeleman .................... | 267/136 |
| 5,330,165 A | * | 7/1994 | van Goubergen ........... | 267/141 |
| 5,766,720 A | | 6/1998 | Yamagishi et al. ........... | 428/71 |
| 6,200,664 B1 | * | 3/2001 | Figge et al. ................ | 102/303 |

* cited by examiner

Primary Examiner—Jack Lavinder
Assistant Examiner—Robert A. Siconolfi
(74) Attorney, Agent, or Firm—Patrick M. Hogan; Glenn W. Bowen

(57) ABSTRACT

A shock isolator for use in a compressive mode comprising a pyramid-shaped elastomer having a cavity therein with the pyramid-shaped elastomer having a base supporting a set of triangular shaped sidewalls that each terminate at a pyramid-shaped apex to create a one-piece elastomer mount so that a force applied to the pyramid apex is transmitted to the base through an offset axis while shock and vibration forces are attenuated by the shear resistance of the shock isolator.

20 Claims, 1 Drawing Sheet

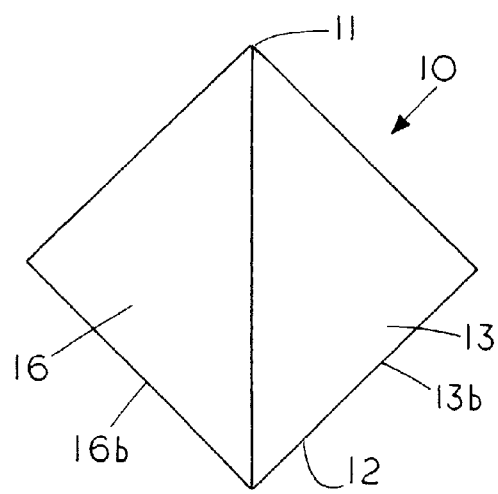
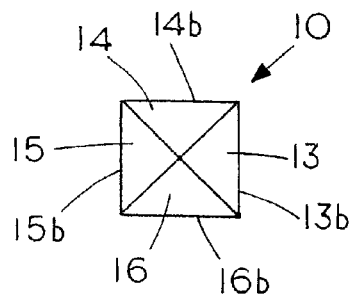
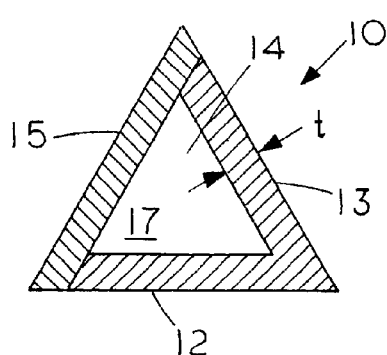
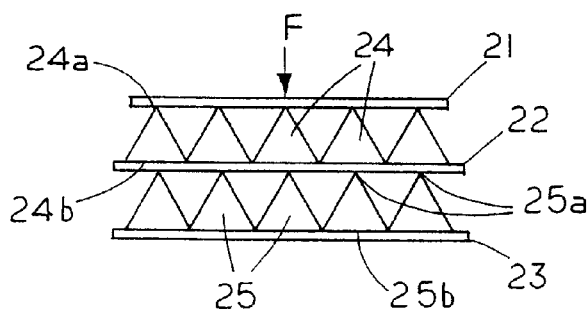
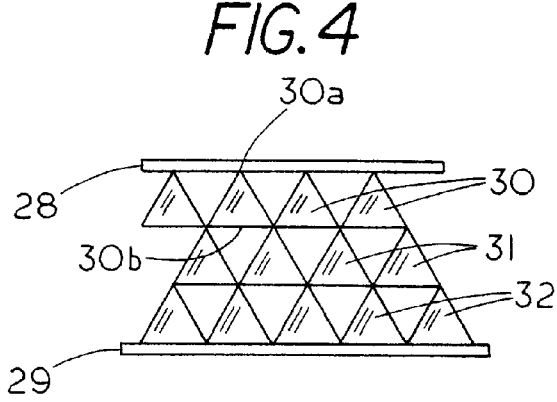
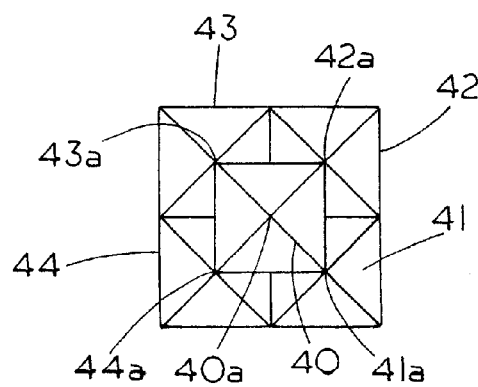

STACKED TETRAHEDRAL ELASTOMER MOUNT

FIELD OF THE INVENTION

This invention relates to shock isolators and, more specifically, to an elastomer mount that can provide offset compressive support, and internal tension and shear resistance to shock and vibration forces.

BACKGROUND OF THE INVENTION

Various elastomeric materials have been used, or suggested for use, to provide shock and/or vibration damping as stated in U.S. Pat. No. 5,766,720, which issued on Jun. 16, 1998 to Yamagisht, et al. These materials include natural rubbers and synthetic resins such as polyvinyl chlorides, polyurethane, polyamides polystyrenes, copolymerized polyvinyl chlorides, and poloyolefine synthetic rubbers as well as synthetic materials such as urethane, EPDM, styrene-butadiene rubbers, nitrites, isoprene, chloroprenes, propylene, and silicones. The particular type of elastomeric material is not critical but urethane material sold under the trademark Sorbothane® is currently employed. Suitable material is also sold by Aero E.A.R. Specialty Composites, Isoloss VL. The registrant of the mark Sorbothane® for urethane material is the Hamiltion Kent Manufacturing Company (Registration No. 1,208,333), Kent, Ohio 44240.

Generally, the shape and configuration of elastomeric isolators have a significant effect on the shock and vibration attenuation characteristics of the elastomeric isolators. The elastomeric isolators employed in the prior art are commonly formed into geometric 3D shapes, such as spheres, squares, right circular cylinders, cones, rectangles and the like as illustrated in U.S. Pat. No. 5,776,720. These elastomeric isolators are typically attached to a housing to protect equipment within the housing from the effects of shock and vibration.

The prior art elastomeric isolators are generally positioned to rely on an axial compression of the elastomeric material or on tension or shear of the elastomeric material. Generally, if the elastomeric isolator is positioned in the axial compressive mode the ability of the elastomeric isolator to attenuate shock and vibration is limited by the compressive characteristics of the material. On the other hand, in the axial compressive mode the elastomeric isolators can be used to provide static support to a housing, which allows a single elastomeric isolator to be placed beneath the housing to support the static weight of the housing.

In general, if the elastomeric isolators are positioned in the shear or tension mode as opposed to an axial compression mode the elastomeric isolators provide better shock and vibration attenuating characteristics in response to dynamic forces due to shock and vibration. Unfortunately, elastomeric isolators, which operate in a shear or tension mode or in the axial compression mode, can generally not be placed beneath a housing to provide static support to the housing without substantially effecting the shock and vibration attenuation characteristics of the elastomeric isolators. Consequently, to provide static support for a housing, as well as effective shock and vibration attenuation characteristics the elastomeric isolators, which operate in the shear or tension mode, are generally placed along side or above a housing so that the elastomeric isolators can function in a shear or tension mode while supporting the static weight of the housing. The positioning in a shear or tension mode can require placing matching elastomeric isolators on each side of the housing.

The present invention provides an elastomeric mount or isolator that provides compressive support for a housing, and the compressive support in relation to the shear support can be preselected by utilization of pyramid-shaped elastomer mounts. The present invention does not require pairing with other shock isolators, although if desired a plurality of shock isolators can be arranged in rows or patterns beneath a housing to provide static support for the housing while at the same time allowing the elastomeric mounts in the shock isolator to provide dynamic attenuation characteristics through shear and tension forces in the elastomer mount. If desired a cavity in the shock isolator can be filled with a damping material to effect the attenuation of shock and vibration forces by the shear and tension resistance of the elastomeric sheet

SUMMARY OF THE INVENTION

A shock isolator for use in a compressive mode comprising a pyramid-shaped elastomer having a cavity therein with the pyramidal shaped elastomer having a base supporting a set of triangular shaped sidewalls that terminate in an apex with the triangular shaped sidewalls cantilevered from the base to terminate at a pyramid apex so that a force applied to the pyramid apex is transmitted to the base through an offset axis.

BRIEF DESCRIPTION OF THE DRAWINGS

FIG. 1 shows a perspective view of a pyramid shock isolator;

FIG. 1a shows a top view of the pyramid shock isolator of FIG. 1;

FIG. 2 is a cross sectional view of the pyramid shock isolator of FIG. 1;

FIG. 3 is a front view showing the shock isolators of FIG. 1 in a stacked condition with an intermediate support plate;

FIG. 4 is a front view showing the shock isolators of FIG. 1 in an alternate stacked condition; and FIG. 5 is a top view showing the apex to base lateral positioning of stacked pyramid mounts of FIG. 1.

DESCRIPTION OF THE PREFERRED EMBODIMENT

FIG. 1 shows a perspective view of an elastomer mount 10 having a pyramidal shape and FIG. 1a shows a top view of elastomer mount 10. Referring to FIG. 1 and FIG. 1a elastomer mount 10 has a first triangular shaped side 13, a second triangular shaped side. 14, a third triangular shaped side 15 and fourth triangular shaped side 16 which join together to terminate in a single pyramid apex 11. An elastomer base 12 engages and supports a base portion 13b of side 13, a base portion 14b of side 14, a base portion 15b of side 15 and a base portion 16b of side 16. Elastomer mount 10 comprises a one-piece elastomer material mount with the apex of each of the triangular shaped sides terminating in the pyramid apex 11. In the embodiment shown the triangular shaped sides 13, 14, 15 and 16 are all the same size. In an alternative embodiment the pyramidal shaped elastomer mount may be a tetrahedron shaped elastomer mount having an equilateral triangles on each of the four sides of the tetrahedron shaped elastomer mount.

FIG. 2 shows a cross sectional view of elastomer mount 10 with sidewall 13, sidewall 14 and sidewall 14 defining an inner pyramidal shaped cavity 17. Pyramidal shape cavity 17 can receive materials for the purposes of changing the damping characteristics. For example, an elastomer different from the elastomer used in the sidewalls and base of elastomer mount 10 could be used in cavity 17 as well as other materials. The thickness of sidewalls is denoted by "t" and can be varied in accordance with the size and support characteristics required of the elastomer mount.

FIG. 3 shows a side view of a first set of pyramidal shape elastomer mounts 24 each having a pyramid apex 24a and a base 24b and a second set of pyramidal shaped elastomer mounts 25 each having a pyramid apex 25a and a base 25b. Each of the bases 24b of the first set of pyramidal shape elastomer mounts 24 are supported by a rigid member 22 and each of the bases of the second set of pyramidal shape elastomer mounts 25 are supported by a rigid member 23. Each of the apexes 24a of pyramidal shape elastomer mounts 24 engage the underside of a rigid member 21 and each of the apexes 25a of pyramidal shaped elastomer mounts 25 engage the under side of intermediate plate 22. The arrangement of rows of pyramidal shaped elastomer mounts 24 and 25 allow one to select the amount of compressive load that can be supported by using more or less elastomer mounts 24 and 25.

The pyramidal shape elastomer mounts of FIG. 3 provide shear resistance to shock and vibration while supporting a static load, such as a cabinet, in a compressive mode. In the mode illustrated in FIG. 3 the two rows of pyramidal shaped elastomer mounts are ganged or stacked together to provide additional support as well as additional shock and vibration attention through the offset compressive axis. That is, a force F on plate 21 is transmitted to each of the pyramid apex in engagement with member 21, and then through the sidewalls which are located at an angle to the plate 21 so as not to place the sidewalls in a direct compression but to place the sidewalls in a shear condition to provide for enhanced shock and vibration attenuation.

FIG. 4 shows an alternate embodiment without intermediate plates wherein each of the pyramidal shaped elastomer mounts comprise separate rows 30, 31 and 32 with the pyramid apexes 30a in one row in engagement with the rectangular shaped bases 30b of the above row. In the top row 30 a rigid plate or member 28 provides the force transfer mechanism for engaging the top row of apexes 30a of pyramidal shape elastomers 30 and in the bottom row plate or member 29 provides the support for engaging the bases 32b of the pyramidal shaped elastomer mounts 32. In the embodiment of FIG. 4 a pyramidal shaped elastomer base 30b engages a pyramid apex of four pyramidal shaped elastomers in row 31. In order to provide extended surface contact between the base and pyramid apexes the apexes can be partially removed to provide a flat support surface. In an alternate method an adapter can be placed on each of the pyramid apexes so as to frictionally engage and maintain the rows of elastomer mounts 30, 31 and 32 in the position shown in FIG. 4.

To illustrate the lateral offset of the pyramid apex of one row or pyramid shaped elastomer mounts with the base of an adjacent row reference should be made to FIG. 5 which shows a first set of pyramidal shape elastomers 41, 42, 43 and 44 each having a respective apex 41a, 42a, 43a and 44a with the apexes located at the corners of base 40b of pyramidal shaped elastomer mount 40. In the embodiment shown each of the pyramidal shaped elastomers are laterally offset from each other in mutually perpendicular axis to provide compressive support through an offset axis while providing shear and tension resistance within each elastomer mount.

The invention also includes the method of making a shock isolator that can be used in a compressive mode while providing shear resistance to shock and vibration. The method includes forming a base 12, forming a first triangular shaped sidewall 13, forming a second triangular shaped sidewall 14, forming a third triangular shaped sidewall 15 and forming a fourth triangular shaped sidewall 16 with each of the sidewalls formed to base 12 and formed to each other to form an integral one-piece elastomer mount 10. One can form a cavity 17 in the elastomer mount 10 by molding or by separately fusing sides together. In the preferred embodiment one molds the elastomer mount and if desired one can change the characteristics of the elastomer mount 10 by placing a damping material in the cavity of the elastomer mount 10.

In order to vary the load support as well as the dynamic characteristics, the present method of using multiple pyramidal shaped elastomers allows one to form a single shock isolator by arranging a first set of individual shock isolators 30 in a laterally offset position from a second set of individual shock isolators 32. In order to transfer forces between two set of isolators the method includes the step of placing a rigid plate 28 above the apex of the top row of shock isolators 30 and a rigid plate below the bottom row of shock isolators 32 to thereby provide for stacked use, which allows the shock isolators to support a load in a compressive mode while at the same providing shear resistance to shock and vibration.

We claim:

1. A shock isolator for use in a compressive mode comprising:

a base; and a first triangular shaped sidewall, a second triangular shaped sidewall, a third triangular shaped sidewall and a fourth triangular shaped sidewall, each of the sidewalls having a base end connected to said base and each of said sidewalls terminating in an apex end with each of the apex ends terminating at a pyramid apex to form a pyramidal shaped elastomer mount having a cavity therein for use in a compressive mode between the pyramid apex and the base with each of the side walls angular offset from each other to thereby provide shear resistance to a shock or dynamic force applied to the pyramid apex.

2. The shock isolator of claim 1 wherein the cavity is a pyramidal shaped cavity located within the shock isolator.

3. The shock isolator of claim 2 wherein the pyramidal shaped cavity includes a damping material to thereby change the dynamic attenuation characteristics of the shock isolator.

4. The shock isolator of claim 1 wherein each of the triangular shaped sidewalls are of the same size.

5. The shock isolator of claim 1 wherein each of the triangular shaped sidewalls form isosceles triangles.

6. The shock isolator of claim 1 wherein the base has a square shape.

7. The shock isolator of claim 6 wherein each of the triangular shaped sidewalls form isosceles triangles.

8. A shock isolator apparatus comprising:

a first set of pyramidal shaped elastomer mounts each having a cavity located therein, a pyramid apex and a base;

a second set of pyramidal shaped elastomer mounts each having a cavity located therein, a pyramid apex and a base with each of the bases of the first set of pyramidal shaped elastomer engaging an apex of the second set of pyramidal shaped elastomer mounts to thereby provide shear resistance to shock and vibration forces while supporting a load in a compressive mode.

9. A shock isolator apparatus of claim 8 wherein a base of one of said second set of pyramidal shaped elastomer mounts engages a pyramid apex of four pyramidal shaped elastomer mounts in said first set of pyramidal shaped elastomer mounts.

10. The shock isolator of claim 8 wherein each of the cavity is a pyramidal shaped cavity located therein.

11. The shock isolator of claim 10 wherein each of the cavities in the pyramidal shaped elastomer mounts includes a damping material therein.

12. The shock isolator of claim 10 wherein the first set of pyramidal shaped elastomer mounts are laterally offset from the second set of pyramidal shaped elastomer mounts in two mutually perpendicular axis.

13. The shock isolator of claim 8 wherein the pyramidal shaped elastomer mount is a tetrahedron shaped elastomer mount.

14. The shock isolator of claim 13 wherein the tetrahedron shaped elastomer mount has an equilateral triangles on each face.

15. The method of making a shock isolator that can be used in a compressive mode while providing shear resistance to shock and vibration forces comprising:

forming a base;

forming a first triangular shaped sidewall, a second triangular shaped sidewall, a third triangular shaped sidewall and a fourth triangular shaped sidewall with each of the sidewalls formed to the base and to each other to thereby form an integral one-piece shock isolator;

forming a cavity in the one-piece shock isolator.

16. The method of claim 15 wherein the step of forming a cavity in the one-piece shock isolator comprise forming a pyramidal shaped cavity in the one-piece shock isolator.

17. The method of claim 16 including the step of placing a damping material in the cavity of the one-piece shock isolator.

18. The method of claim 15 including forming a plurality of shock isolators into a single shock isolator by arranging a first, set of shock isolators in a laterally offset position from a second set of shock isolators.

19. The method of claim 18 including the step of placing a rigid plate above the base of the first set of shock isolators and a rigid plate below the second set of shock isolators to thereby provide for use of said second set of shock isolators and said first set of shock isolators in a compressive mode while providing shear resistance to shock and vibration.

20. A shock isolator for supporting a load in a compressive mode and for absorbing vibration energy comprising:

an elastomer base;

a first elastomer sidewall, a second elastomer sidewall, a third elastomer sidewall and a fourth elastomer sidewall, each of the sidewalls having a base end connected to said base and each of said sidewalls terminating in an apex end with each of the apex ends terminating at a common apex to form an elastomer mount having a cavity therein for use in a compressive mode between the common apex and the base with each of the sidewalls angular offset from each other to thereby provide shear resistance to a shock or dynamic force applied to the common apex.

* * * * *